(12) United States Patent
Shinmura

(10) Patent No.: US 7,595,721 B2
(45) Date of Patent: Sep. 29, 2009

(54) RADIO TAG-MOUNTING MEMBER FOR USE IN TIRE, PNEUMATIC TIRE, AND ASSEMBLY COMPOSED OF PNEUMATIC TIRE AND RIM

(75) Inventor: Yasushi Shinmura, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 343 days.

(21) Appl. No.: 11/638,526

(22) Filed: Dec. 14, 2006

(65) Prior Publication Data
US 2007/0146124 A1 Jun. 28, 2007

(30) Foreign Application Priority Data
Dec. 28, 2005 (JP) ............... 2005-379034

(51) Int. Cl.
*B60C 23/00* (2006.01)
(52) U.S. Cl. .................. 340/447; 340/572.8
(58) Field of Classification Search ........... 340/572.8, 340/442, 445, 447
See application file for complete search history.

(56) References Cited

U.S. PATENT DOCUMENTS

| | | | |
|---|---|---|---|
| 6,724,301 B2 * | 4/2004 | Ginman et al. ............. | 340/447 |
| 7,292,138 B2 * | 11/2007 | Jang ............................ | 340/442 |
| 2004/0074974 A1 * | 4/2004 | Senba et al. ............. | 340/572.8 |
| 2005/0133132 A1 * | 6/2005 | Girard et al. ............. | 152/152.1 |

FOREIGN PATENT DOCUMENTS

| | | |
|---|---|---|
| JP | 08-011885 A | 1/1996 |
| JP | 11-278021 A | 10/1999 |
| JP | 2001-203523 A | 7/2001 |
| JP | 2005-178753 A | 7/2005 |
| JP | 2005-205977 A | 8/2005 |

* cited by examiner

*Primary Examiner*—Thomas J Mullen
(74) *Attorney, Agent, or Firm*—Birch, Stewart, Kolasch & Birch, LLP

(57) ABSTRACT

A radio tag-mounting member for use in a pneumatic tire having a sponge material fixed to the pneumatic tire at a rim-mounted side surface thereof or/and a rim at a tire-mounted side surface thereof; and a radio tag having a portion for detecting an internal state of the pneumatic tire or/and a portion for recording identifying information of the pneumatic tire. The radio tag is inserted into and fixedly accommodated in an accommodating portion formed in the sponge material as a concavity or as a slit-shaped notch; or the radio tag is fixed to a surface of the sponge material.

5 Claims, 6 Drawing Sheets

Patent document 1: Japanese Patent Application Laid-Open No.2005-205977

RADIO TAG-MOUNTING MEMBER FOR USE IN TIRE, PNEUMATIC TIRE, AND ASSEMBLY COMPOSED OF PNEUMATIC TIRE AND RIM

This nonprovisional application claims priority under 35 U.S.C. § 119(a) on Patent Application No(s). 2005-379034 filed in Japan on Dec. 28, 2005, the entire contents of which are hereby incorporated by reference.

FIELD OF THE INVENTION

The present invention relates to a radio tag-mounting member for use in a tire, a pneumatic tire, and an assembly composed of the pneumatic tire and a rim. More particularly, the present invention relates to a radio tag-mounting member for use in a tire which protects a radio tag mounted on the tire from being subjected to external shocks and vibrations and which is capable of stably accommodating the radio tag therein for a long time, with the radio tag fixed thereto; a pneumatic tire on which the radio tag-mounting member is mounted; and an assembly composed of the pneumatic tire and the rim.

DESCRIPTION OF THE RELATED ART

Heretofore the radio tag having a sensor for detecting the internal state of the tire such as the air pressure of a tire and a recording portion for recording the inherent identifying information thereof is directly bonded to the inner side surface of the tire or embedded inside the tire to judge the state of the tire during travel of a car or utilize the information of the tire provided by the radio tag for maintenance service and the like.

The radio tag is bonded to the inner side surface of the tire before or after the tire is vulcanized.

When the radio tag is bonded to the inner side surface of the tire before the tire is vulcanized, there are various vulcanization-caused influences on the radio tag. Thus there is a fear that the radio tag does not perform its function. On the other hand, when the radio tag is bonded to the inner side surface of the tire after the tire is vulcanized, it is necessary to buff rubber disposed on the inner side of the tire. There is a possibility that the buffing causes the inner side of the tire to be damaged and that the radio tag separates from the inner side surface of the tire.

The radio tag bonded to the inner side surface of the tire is susceptible to shocks and vibrations and has a problem in its durability.

The present applicant proposed a method of embedding the radio tag inside the tire, as disclosed in Japanese Patent Application Laid-Open No.2005-205977 (patent document 1). The radio tag has the wheel speed detecting means such as the angular velocity sensor; the storing means for storing the wheel speed; the tire judging means for judging whether a right-side tire and a left-side tire of a driving wheel and/or a driven wheel are of the same kind based on the tire information provided by the radio ID tag, embedded in the tire, in which the tire information such as a wear degree of the tire, a longitudinal rigidity, a manufactured time, and the like is recorded; and the depressurization judging means for judging whether the air pressure of the tire has decreased by using a wheel speed corrected based on a result of judgement of the tire judging means.

But to embed the radio ID tag inside the tire, it is necessary to provide the step of embedding the radio tag in the tag-accommodating portion formed at the inner side of the tire. Thus the radio tag has room for improving handleability and productivity and a problem of protecting the radio tag from shocks and vibrations.

SUMMARY OF THE INVENTION

The present invention has been made in view of the above-described problems. Therefore it is an object of the present invention to provide a radio tag-mounting member for a tire which appropriately protects a radio tag mounted on the tire from being subjected to external shocks and vibrations, is capable of stably accommodating the radio tag therein for a long time with the radio tag fixed thereto, and allows the radio tag to be easily mounted on the tire; a pneumatic tire on which the radio tag-mounting member is mounted; and an assembly composed of the pneumatic tire and a rim.

To solve the above-described problems, the first invention provides a radio tag-mounting member for use in a pneumatic tire having a sponge material fixed to the pneumatic tire at a rim-mounted side surface thereof or/and a rim at a tire-mounted side surface thereof; and a radio tag having a portion for detecting an internal state of the pneumatic tire or/and a portion for recording identifying information of the pneumatic tire. The radio tag is inserted into and fixedly accommodated in an accommodating portion formed in the sponge material as a concavity or a slit-shaped notch; or the radio tag is fixed to a surface of the sponge material.

As described above, the radio tag is mounted on the sponge material fixed to the pneumatic tire at the rim-mounted side surface thereof or/and the rim at the tire-mounted side surface thereof. In this construction, porous portions of the sponge material present on the surface thereof and in the inside thereof have a function of converting vibrations of air into heat energy to consume the vibrations of air, thereby reducing a cavity resonant energy and a road noise. By accommodating the radio tag in the sponge material having the effect of suppressing vibration of the tire, the radio tag is appropriately protected from being subjected to external shocks and vibrations and can be enhanced in its durability.

In the present invention, the radio tag is not directly embedded in the tire, but the sponge material having the radio tag fixedly accommodated in the accommodating portion thereof formed as the concavity or as the slit-shaped notch is fixed to the tire or/and the rim. Alternatively the sponge material having the radio tag fixed to the surface thereof is fixed to the tire or/and the rim. Therefore the durability of the tire can be enhanced without damaging the tire. Further the radio tag can be mounted on the tire with a high workability.

The sponge material has a porous construction. The sponge material includes sponge itself consisting of rubber or synthetic resin foamed to form interconnected cells therein. The sponge material also includes a web-like material composed of animal fibers, plant fibers or synthetic fibers intertwined and integrally connected with one another. The "porous construction" includes not only a construction having the interconnected cells formed therein, but also a construction having closed cells formed therein.

The sponge material which can be used in the present invention is not limited to a specific material, but it is possible to preferably use synthetic resin sponge such as ether group-containing polyurethane sponge, ester group-containing polyurethane sponge, polyethylene sponge, and the like; and rubber sponge such as chloroprene rubber sponge (CR sponge), ethylene propylene rubber sponge (EPDM sponge), nitrile rubber sponge (NBR sponge), and the like. Above all, the polyurethane sponge including the ether group-containing polyurethane sponge or the polyethylene sponge are especially preferable, considering that these sponges decrease noise, are lightweight, can be adjusted in the degree of foam to be formed therein, and are durable.

In filling a high-pressure air into the assembly composed of the pneumatic tire and the rim by using a compressor, water (moisture) contained in the high-pressure air may penetrate into an inner space surrounded with the rim and the pneumatic tire mounted on the rim. In this sense, the ether group-containing polyurethane sponge resistant to hydrolysis can be preferably used as the sponge material.

It is preferable to make the sponge material water-repellent to prevent water from soaking thereinto when the sponge material is wet.

It is also preferable to make the sponge material mildew-resistant to prevent moisture-caused mildew from being generated.

It is especially preferable to make the sponge material of a material not containing halogen atoms to reduce the toxicity of an exhaust gas, when a waste tire is thermally disposed.

One surface of the sponge material is formed as a fixed surface to be fixed to the pneumatic tire at the rim-mounted side surface thereof or/and the rim at the tire-mounted side surface thereof, with the rim-mounted side surface and the tire-mounted side surface facing the inner space surrounded with the rim and the pneumatic tire mounted thereon. A surface of the sponge material opposite to the fixed surface thereof is formed as a free surface facing the inner space. The accommodating portion of the sponge material has an opening formed on the free surface. The radio tag is inserted into the accommodating portion from the opening and fixed thereto with an adhesive agent or by press fit.

As described above, one surface of the sponge material is formed as the fixed surface to be fixed to the pneumatic tire at the rim-mounted side surface thereof or/and the rim at the tire-mounted side surface thereof, with the rim-mounted side surface and the tire-mounted side surface facing the inner space surrounded with the rim and the pneumatic tire mounted thereon. The surface of the sponge material opposite to the fixed surface thereof is formed as the free surface facing the inner space of the tire. Thereby the sponge material is prevented from freely moving inside the inner space, when a car is traveling.

There is a possibility that a bead portion of the pneumatic tire is pressed strongly against the pneumatic tire-mounted side surface of the rim at a tire-replacing time. Thus it is especially preferable to fix the sponge material to the rim-mounted side surface of the pneumatic tire. It is also preferable that the fixed surface of the sponge material is substantially flat to allow the fixed surface of the sponge material to be bonded to the rim-mounted side surface of the pneumatic tire or the pneumatic tire-mounted side surface of the rim in a sufficient area.

The accommodating portion of the sponge material has the opening formed on the free surface. The radio tag is inserted into the accommodating portion from the opening and fixed thereto with the adhesive agent or by press fit. This construction allows the radio tag to be easily inserted into the accommodating portion from the opening formed on the free surface of the sponge material and securely fixed to the accommodating portion with the adhesive agent or by press fit without the radio tag dropping from the sponge material.

A sectional configuration of the sponge material orthogonal to a circumferential direction thereof is trapezoidal or rectangular. The accommodating portion is formed as a shallow concavity on the free surface. The radio tag is horizontally inserted into and fixed to the accommodating portion with the adhesive agent. Alternatively a slit is formed on the free surface as the accommodating portion by cutting the sponge material from the free surface toward the fixed surface; and the radio tag is fixed to the accommodating portion by press fit. It is preferable that the radio tag is embedded in the accommodating portion without projecting the radio tag from the surface of the sponge material.

As described above, because the configuration of the section of the sponge material orthogonal to the circumferential direction of the pneumatic tire is trapezoidal or rectangular, it is easy to secure the space for accommodating the radio tag therein in a stable state. Further, from the standpoint of the productivity and durability of the sponge material and the effect of the sponge material of decreasing the road noise, it is preferable that the sponge material has the above-described sectional configuration. When the sponge material is trapezoidal, it is preferable that the sponge material is symmetrical in the right-to-left direction with respect to the center line of the width thereof. When the sectional configuration of the sponge material is unsymmetrical with respect to the center line of the width thereof, the widthwise rigidity of the sponge material at the left side thereof is different from the widthwise rigidity thereof at the right side thereof. Thereby the sponge material is liable to fall widthwise to the side having a lower rigidity.

It is preferable that the sponge material is extended in the circumferential direction of the tire and that the sponge material has a tapered portion, formed at both end portions thereof in the circumferential direction of the tire, whose height decreases gradually at both end portions thereof. This construction prevents a crack at both end portions of the sponge material in the circumferential direction of the tire to a high extent, even when the car travels at a high speed and further, prevents the sponge material from being damaged by a tire lever or the like, when the rim is assembled.

An annular sponge material not having a joint in the circumferential direction of the tire may be formed. In addition, an annular sponge material having a joint in the circumferential direction of the tire may be formed by connecting both ends of a long bar-shaped material to each other with a double-side adhesive tape or the adhesive agent.

The accommodating portion is formed as the shallow concavity on the free surface. The radio tag is horizontally inserted into and fixed to the accommodating portion with the adhesive agent. Thereby the radio tag can be fixed to the accommodating portion very easily and reliably.

Instead of forming the accommodating portion as the shallow concavity, the accommodating portion may be formed as the slit by cutting the sponge material from the free surface thereof toward the fixed surface thereof to fix the radio tag to the accommodating portion by press fit. Thereby the radio tag and the sponge material are allowed to contact in a sufficient area. Further the radio tag is influenced to a low extent by external shocks and vibrations. Furthermore by merely fitting the radio tag into the slit formed as the accommodating portion by press fit, it is possible to firmly fix the radio tag to the accommodating portion without using the adhesive agent.

To form the slit on the free surface of the sponge material, the free surface does not necessarily have to be cut in the circumferential direction of the tire but may be cut in a direction in which the free surface is formed easily.

By embedding the radio tag in the slit without projecting the radio tag from the surface of the sponge material, the radio tag is not directly subjected to shocks and vibrations. Thus it is possible to enhance the durability of the radio tag.

As described above, the radio tag may be bonded to the surface of the sponge material with the adhesive agent or the like. In this case, it is unnecessary to process the sponge material and possible to enhance the degree of freedom in the mounting position of the radio tag.

The sponge material has a volume V2 in a range from 0.4 to 20% of an entire volume V1 of the inner space surrounded with the pneumatic tire and the rim and a specific gravity in a range from 0.005 to 0.06.

By setting the volume V2 of the sponge material to not less than 0.4% of the entire volume V1 of the inner space of the tire, as described above, the sponge material is capable of providing the effect of decreasing the road noise by not less than about 2 dB. Owing to the great effect of the sponge material of suppressing vibrations, the radio tag accommodated in the sponge material can be securely protected from being subjected to external shocks and vibrations. The sponge material has the volume V2 favorably not less than 1%, more favorably not less than 2%, and most favorably not less than 4% of the entire volume V1 of the inner space of the tire.

On the other hand, when the volume V2 of the sponge material exceeds 20% of the entire volume V1 of the inner space, there is no increase in the effect of the sponge material of decreasing the road noise and there is an increase in the manufacturing cost, and further there is a fear that the weight balance of the assembly composed of the pneumatic tire and the rim becomes unfavorable. In view of the above-described standpoints, it is more favorable that the volume V2 of the sponge material is set to not more than 10% of the entire volume V1 of the inner space.

In the present specification, the "volume V2" of the sponge material means an apparent entire volume thereof, namely, the volume determined from the outer configuration of the sponge material including air bubbles present inside it.

The "entire volume V1 of the inner space" is approximately determined from the following equation in a normal state in which a normal internal pressure is applied to the assembly and no load is applied thereto.

$$V1 = A \times \{(Di-Dr)/2 + Dr\} \times \pi$$

In the above-described equation, "A" is the transverse area of the inner space obtained by CT-scanning it in the normal state; "Di" is the maximum outer diameter of the inner space of the tire in the normal state; "Dr" is the diameter of the rim, and "π" is the ratio of the circumference of a circle to its diameter.

The above-described "normal internal pressure" means an air pressure set in each of the standards systems including the standard on which the tire is based. For example, the normal internal pressure means a maximum air pressure in the case of JATMA, a maximum value described in the table "TIRE LOAD LIMITS AT VARIOUS COLD INFLATION PRESSURES" in the case of TRA, and "INFLATION PRESSURE" in the case of ETRTO. In the case of a tire for use in a passenger car, the normal internal pressure is 200 kPa in consideration of an actual use frequency.

The reason it is favorable that the sponge material has a specific gravity in the range from 0.005 to 0.06 is as follows: When the specific gravity of the sponge material is below 0.005 or exceeds 0.06, the effect of the sponge material of suppressing the road noise is liable to be small, and the effect of the sponge material of protecting the radio tag accommodated in the accommodating portion thereof from being subjected to shocks and vibrations is also liable to be small. Further by setting the specific gravity of the sponge material to low values, it is possible to prevent the weight of the tire and the tire balance from being adversely affected to a high extent and enhance the noise-absorbing performance of the sponge material by increasing the porosity thereof.

The specific gravity of the sponge material is favorably in the range of 0.010 to 0.05, more favorably in the range of 0.016 to 0.05, and most favorably in the range of 0.016 to 0.035.

The specific gravity of the sponge material is obtained by converting an apparent density measured in conformity to "apparent density" of item 5 of JIS to the specific gravity.

The thickness T of the sponge material from the fixed surface thereof to the free surface thereof is set to favorably not more than 30 mm, more favorably not more than 25 mm, and most favorably not more than 20 mm. The thickness T is measured in a state in which the sponge material has been mounted on the tire and the rim has not been assembled (at normal temperature and normal pressure). The thickness T is measured in a direction perpendicular to the fixed surface of the sponge material.

When the thickness T of the sponge material exceeds 30 mm, the sponge material is liable to fall widthwise and crack when the car travels at a high speed. On the other hand, when the thickness T of the sponge material is too small, the effect of the sponge material of decreasing the road noise tends to decrease. In view of these standpoints, the thickness T of the sponge material is set to favorably not less than 10 mm and more favorably not less than 15 mm. If the thickness T of the sponge material is inconstant, a maximum thickness T satisfies the above-described numerical range.

It is preferable that in view of the durability of the sponge material, the sponge material has a width W (see FIG. 2) in the axial direction of the tire equal to the thickness T thereof or larger than the thickness T. Thereby it is possible to enhance the stability of the sponge material and securely prevent the sponge material from falling widthwise, when the car travels at a high speed. It is especially preferable that the width W of the sponge material is larger than the thickness T thereof. More specifically, the ratio of the thickness T to the width W (T/W) is set to not more than 0.7, favorably not more than 0.6, and more favorably not more than 0.4, and most favorably not more than 0.3. It is desirable that the ratio T/W is set to not less than 0.10.

It is preferable that the hardness of the sponge material is set to the range of 10 to 250 N and that the tensile strength thereof is not less than 70 kPa. By limiting the hardness of the sponge material to the above-described range, the sponge material is provided with a demanded proper elongation. Because the sponge material is provided with the above-described proper elongation, when a strain acts on the sponge material, the sponge material is capable of dispersing a stress in a wide range and preventing the stress from concentrating on the rim-mounted side surface of the tire or the tire-mounted side surface of the rim and the fixed surface of the sponge material.

The hardness of the sponge material is set to favorably not less than 20 N, more favorably not less than 50 N, and most favorably not less than 80 N. The hardness of the sponge material is set to favorably not more than 240 N, more favorably not more than 230 N, and most favorably not more than 220 N.

By limiting the tensile strength of the sponge material to a range shown below, it is possible to enhance the strength of the sponge material to the above-described stress. It is particularly preferable that the tensile strength of the sponge material is not less than 80 kPa. Although the upper limit of the tensile strength of the sponge material is not specified, the upper limit of the tensile strength thereof is favorably not more than 160 kPa and more favorably not more than 150 kPa in view of the cost thereof, the productivity thereof, and easiness of obtaining it on the market.

The sponge material accommodating the radio tag fixedly in the accommodating portion formed as the concavity or as the slit-shaped notch can be preferably fixed to the the pneumatic tire at the rim-mounted side surface thereof or/and the rim at the tire-mounted side surface thereof with the adhesive agent or the double-side adhesive tape.

As the adhesive agent, it is preferable to use a synthetic rubber-containing liquid adhesive agent of a solution type composed of an organic solvent and synthetic rubber dissolved therein or a latex type composed of water and synthetic rubber dispersed therein.

It is possible to use the double-side adhesive tape composed of a sheet-shaped base material such as woven cloth and an adhesive layer formed on both surfaces thereof, the double-side adhesive tape not having the base material but consisting of an adhesive layer, and the like. By bonding one of both adhesive layers of the double-side adhesive tape to the fixed surface of the sponge material and covering the other adhesive layer thereof with a release sheet of paper, it is possible to separate the release sheet of paper from the other adhesive layer as necessary and easily bond the double-side adhesive tape to the rim-mounted side surface of the tire or/and the tire-mounted side surface of the rim. The double-side adhesive tape can be used more favorably than the adhesive agent, because the double-side adhesive tape can be handled easily and is excellent in the efficiency of a bonding work.

When the car travels at a high speed, the internal temperature of the tire may rise to about 120° C. Therefore the double-side adhesive tape is demanded to have a high adhesive strength at both normal and high temperatures. It is desirable that the peeling strength of the double-side adhesive tape is not less than 0.147 N/mm (0.015 kgf/mm) at 25° C. (normal temperature) and not less than 0.0588 N/mm (0.006 kgf/mm) at 125° C. (high temperature).

It is preferable that the radio tag consists of an RFID tag having a sensor portion for detecting an internal state of the tire such as an internal temperature of the tire, an internal pressure thereof, and the like; a recording portion for recording inherent identifying information for specifying each tire such as a manufacturer thereof, a manufacturing factory, a manufactured date, and the like; or/and a recording portion capable of rewriting history information of the tire such as a travel distance thereof, a number of suddenly braked times, a number of suddenly started times, and/or a number of suddenly turned times, and the like; and a signal-sending portion for sending signals sent from the sensor portion or/and the recording portions to an antenna mounted on a car body in such a way that the antenna is capable of receiving the signals.

As described above, the radio tag consisting of the RFID tag has the sensor portion for detecting the internal state of the tire. Thus it is possible to sequentially detect the internal state of the tire such as the internal temperature thereof and the internal pressure thereof. Further by sending the signals transmitted from the sensor portion to the car body through the signal-sending portion, results of detection of the sensor portion can be utilized to control the operation of the car.

The sensor portion may be accommodated inside the accommodating portion formed on the sponge material in the form of an IC chip or the like, separately from the RFID tag for tire-identifying use.

It is preferable that the RFID tag has the recording portion for recording the inherent identifying information for specifying each tire such as the manufacturer thereof, the manufacturing factory, and the manufactured date and in addition the recording portion capable of rewriting history information of the tire such as the travel distance thereof, the number of suddenly braked times, the number of suddenly started times, and/or the number of suddenly turned times. Thereby it is possible to write information relevant to the tire unrecognizable only by the inherent identifying information of the tire to the recording portion. Further it is possible to obtain various information relevant to the tire by reading written information from the reader/writer (R/W apparatus) through the signal-sending portion. Thereby it is possible to enhance maintenance service of the tire. Particularly because the RFID tag has the recording portion capable of rewriting latest history information of the tire, it is possible to enhance a maintenance inspection service of the car which is carried out at a car inspection place by utilizing the latest information from the tire.

The second invention provides a pneumatic tire wherein a radio tag-mounting member for use in a tire is fixed to a rim-mounted side surface of a tread region.

The tread region means a region of the tire reinforced with a belt layer thereof. A centrifugal force is directed outward in the radial direction of the tire, when the car travels at a high speed. Thus as described above, by fixing the radio tag-mounting member for use in the tire to the rim-mounted side surface of the tread region, the radio tag-mounting member can be effectively pressed against the tire by utilizing the centrifugal force to thereby restrain the movement of the radio tag-mounting member. Therefore the second invention provides the pneumatic tire in which the road noise is reduced greatly, and the radio tag is stably fixed to the sponge material, with the radio tag being appropriately protected from being subjected to shocks and vibrations.

It is preferable that the center of the fixed surface of the radio tag-mounting member for use in the tire in the widthwise direction thereof is substantially coincident with the equator of the tire.

The third invention provides an assembly composed of a pneumatic tire and a rim, wherein the radio tag-mounting member for use in the tire is fixed to the rim on which the pneumatic tire is mounted.

By constructing the assembly composed of the rim to which the radio tag-mounting member for use in the tire is fixed and the pneumatic tire, it is unnecessary to perform a work inside the tire and hence enhance the rim-assembling efficiency. Therefore it is possible to manufacture the assembly of the third invention composed of the pneumatic tire and the rim with a high operating efficiency. In the pneumatic tire, the road noise is reduced greatly, and the radio tag is stably fixed to the sponge material, with the radio tag being appropriately protected from being subjected to shocks and vibrations.

As apparent from the foregoing description, in the radio tag-mounting member for use in the tire, the radio tag is fixedly accommodated in the accommodating portion formed as the concavity or the slit-shaped notch in the sponge material which is fixed to the pneumatic tire at the rim-mounted side surface thereof or/and the rim at the tire-mounted side surface thereof. Therefore the radio tag is stably fixed to the sponge material, with the radio tag being appropriately protected from being subjected to shocks and vibrations. Further the radio tag can be mounted on the tire with a high workability. Because the radio tag is not directly embedded in the tire, the durability of the tire can be enhanced without damaging the tire.

In the pneumatic tire of the present invention, the radio tag-mounting member for use in the tire is fixed to the rim-mounted side surface of the tread region. Therefore the road noise is reduced greatly, and the radio tag mounted on the sponge material is appropriately protected from being subjected to shocks and vibrations.

In the assembly composed of the pneumatic tire and the rim, the rim to which the radio tag-mounting member for use in the tire is fixed is mounted on the pneumatic tire. Therefore the rim-assembling operation can be performed with high efficiency. Further the road noise is reduced greatly, and the radio tag mounted on the sponge material is appropriately protected from being subjected to shocks and vibrations.

DETAILED DESCRIPTION OF THE PREFERRED EMBODIMENTS

The embodiments of the present invention will be described below with reference to the drawings.

Figure 1:
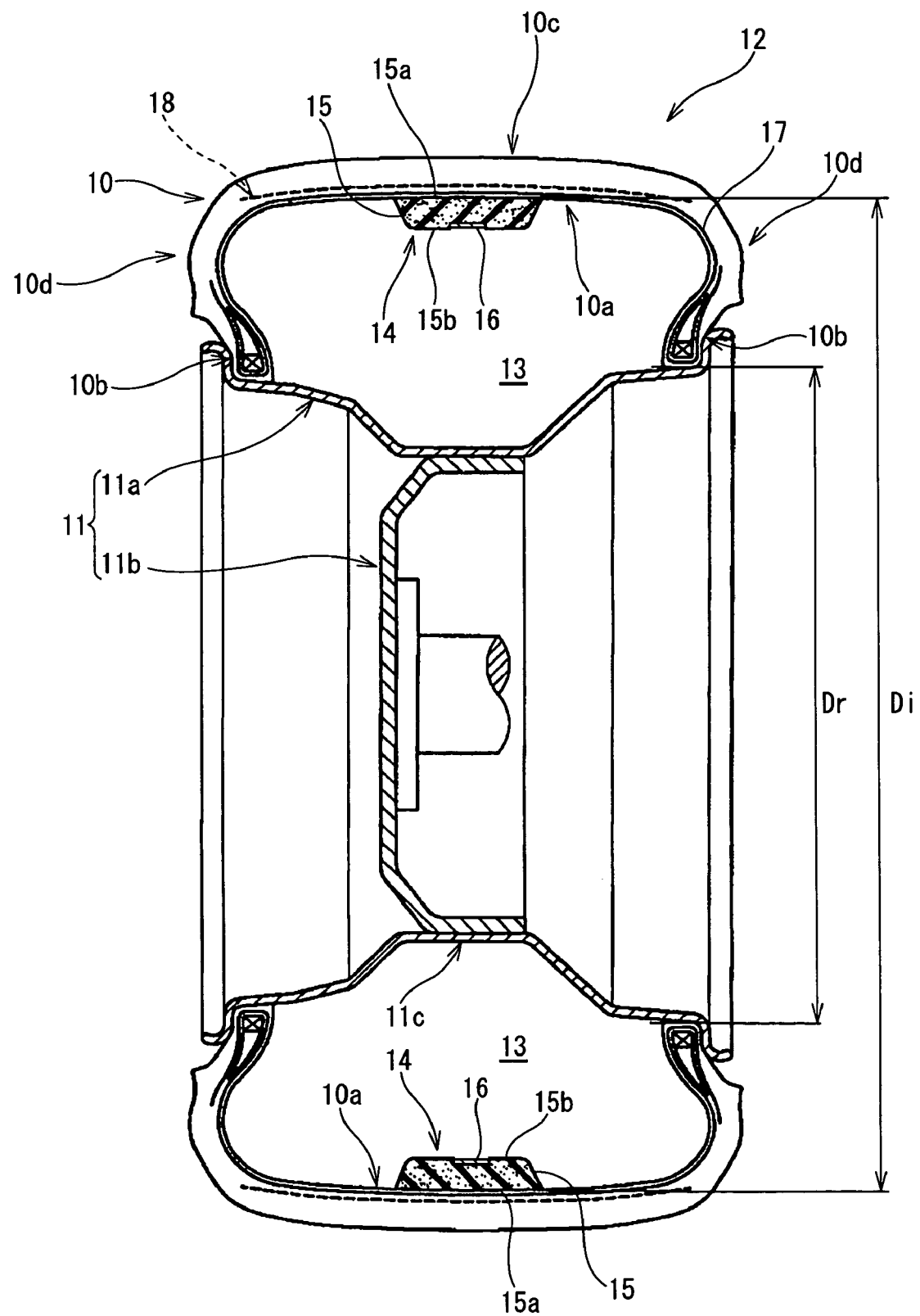
FIG. 1 is a sectional view showing an assembly, composed of a pneumatic tire and a rim, of a first embodiment of the present invention.
Figure 2:
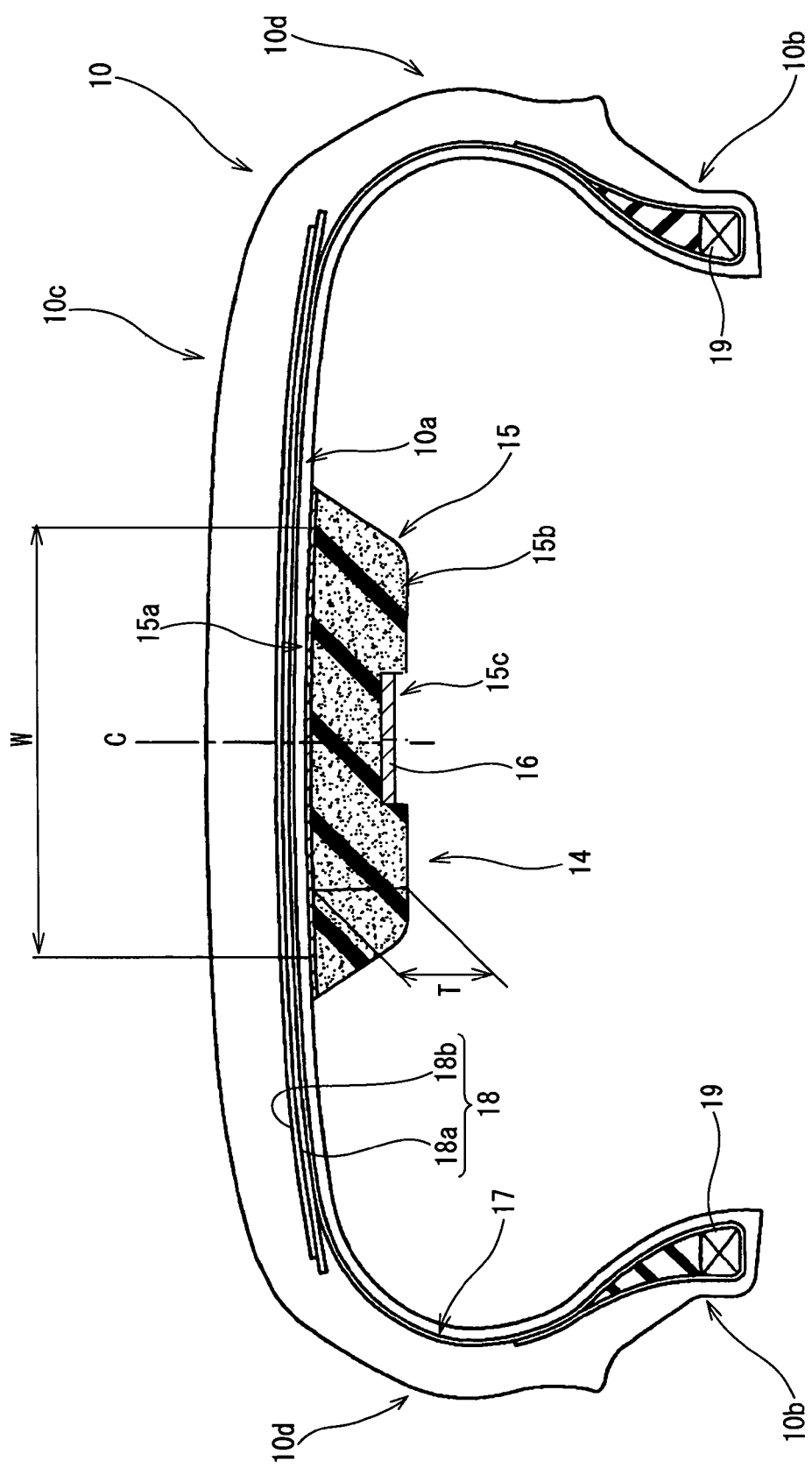
FIG. 2 is an enlarged sectional view showing the pneumatic tire shown in FIG. 1.
Figure 3:
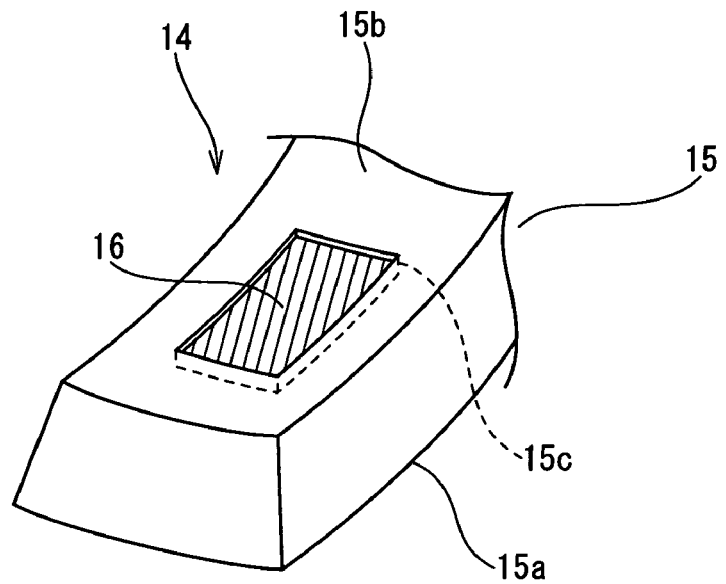
FIG. 3 is an enlarged sectional view showing a radio tag-mounting member for use in a tire.
Figure 4:
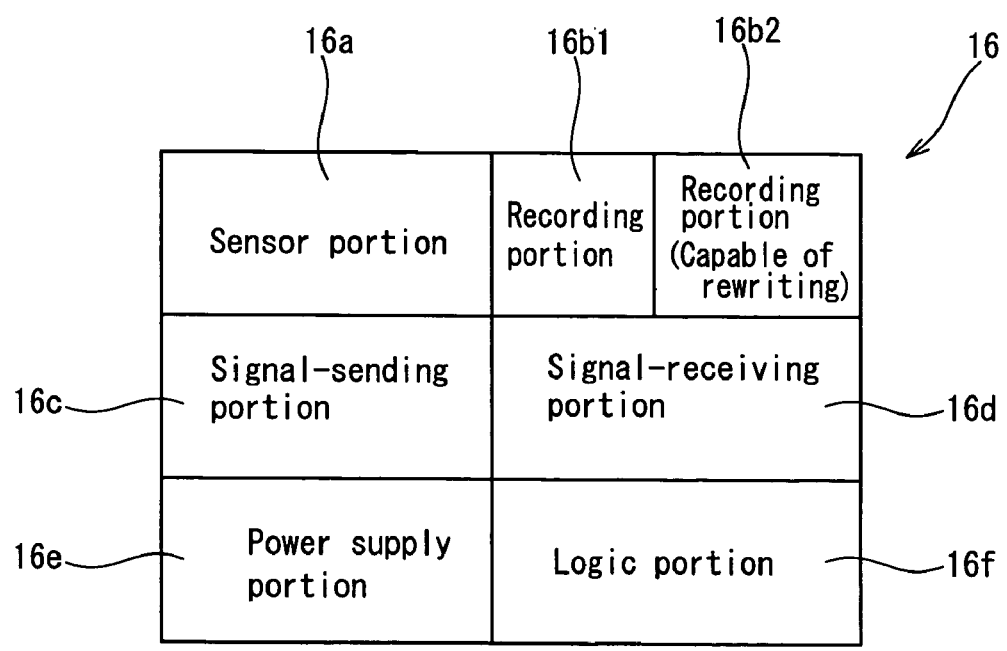
FIG. 4 shows the construction of an RFID tag.

FIG. 1 is a sectional view, taken along the meridian line including the rotational shaft of the pneumatic tire, which shows an assembly 12 (hereinafter often referred as merely assembly), composed of a pneumatic tire 10 (hereinafter often referred as merely tire) and a rim 11, of a first embodiment of the present invention. FIG. 2 is an enlarged sectional view showing the pneumatic tire shown in FIG. 1. FIG. 3 is an enlarged sectional view showing a radio tag-mounting member 14 of the present invention, for use in a tire, which is fixed to the tire 10. FIG. 4 shows the construction of a radio tag (RFID tag 16).

In the assembly 12, with a double-side adhesive tape, a radio tag-mounting member 14 for use in the tire 10 is fixedly mounted on a rim-mounted side surface 10a of a tread region 10c of the tire 10 facing an inner space 13 surrounded with the rim 11 and the tire 10 mounted on the rim 11.

The radio tag-mounting member 14 for use in the tire is constructed of the sponge material 15 and the RFID tag 16. The sponge material 15 is extended continuously in the circumferential direction of the tire 10. A tapered portion whose height decreases gradually is formed at both ends of the sponge material 15 in the circumferential direction of the tire 10. As shown in FIG. 2, the sectional configuration of the sponge material 15 orthogonal to the circumferential direction of the tire is trapezoidal and symmetrical with respect to a center line of a width W thereof.

The sponge material 15 has a fixed surface 15a to be fixed to the rim-mounted side surface 10a of the tire 10 and a free surface 15b, disposed at an opposite side of the fixed surface 15a, which faces the inner space 13. The area of the fixed surface 15a is set larger than that of the free surface 15b. An accommodating portion 15c is formed as a shallow concavity on the free surface 15b. The RFID tag 16 is horizontally inserted into and fixed to the accommodating portion 15c with an adhesive agent.

The fixed surface 15a of the sponge material 15 is substantially flat to allow the fixed surface 15a to be bonded to the rim-mounted side surface 10a of the tire 10 in a sufficient area.

The sponge material 15 is made of polyurethane sponge having interconnected cells formed therein and has a volume V2 in the range of 0.4 to 20% of an entire volume V1 of the inner space 13. In the first embodiment, the volume V2 of the sponge material 15 is set to 6.4% of the entire volume V1 of the inner space 13. The specific gravity of the sponge material 15 is set to 0.005 to 0.06. In the first embodiment, the specific gravity of the sponge material 15 is set to 0.02.

A thickness T of the sponge material 15 from the fixed surface 15a thereof to the free surface 15b thereof is set to 10 mm to 30 mm. In the first embodiment, the thickness T is set to 20 mm. The ratio of the thickness T to the width W is set to 0.1 to 0.7. In the first embodiment, the ratio T/W is set to 0.2.

The hardness of the sponge material 15 is set to 20 N to 240 N. In the first embodiment, the hardness of the sponge material 15 is set to 120 N. The tensile strength of the sponge material 15 is set to 80 kPa to 160 kPa. In the first embodiment, the tensile strength thereof is set to 110 kPa.

As shown in FIG. 4, the RFID tag 16 has a sensor portion 16a for detecting an internal temperature of the tire, an internal pressure of the tire, and the like; a recording portion 16b1 for recording inherent identifying information of the tire such as a manufacturer of the tire, a manufacturing factory, a manufactured date, and the like; a recording portion 16b2 capable of rewriting history information of the tire such as a travel distance thereof, the number of suddenly braked times, the number of suddenly started times, the number of suddenly turned times, and the like; and a signal-sending portion 16c for sending signals sent from the sensor portion 16a and the recording portions 16b1, 16b2 to an antenna (not shown) of a reader/writer (R/W apparatus, not shown) mounted on a car body. The RFID tag 16 further has a signal-receiving portion 16d, a power supply portion 16e, and a logic portion 16f. The signal-receiving portion 16d receives radio waves from the car body. The power supply portion 16e changes the radio waves into a power supply that is used by the entire circuit of the RFID tag 16. The logic portion 16f executes processing in accordance with instructions sent from the reader/writer (R/W apparatus not shown) mounted on the car body.

In the first embodiment, the rim 11 is a two-piece wheel rim, made of metal, which has a body 11a on which a bead portion 10b of the tire 10 is mounted and a disk 11b which holds the body 11a and is fixed to a wheel axle. But the rim 11 may be a one-piece rim. In the first embodiment, as the rim 11, a normal rim specified by the above-described standards such as JATMA is adopted.

As shown in FIGS. 1 and 2, the tire 10 of the first embodiment is a tubeless tire having a tread part 10c, a pair of sidewall parts 10d, 10d extended radially inward from both ends of the tread part 10c, and a pair of bead parts 10b, 10b formed at inner ends of the sidewall part 10d, 10d in the radial direction of the tire 10. The tire 10 is used for a passenger car. Therefore the rim-mounted side surface 10a of the tire 10 is covered with an inner liner rubber through which air is permeable to a low extent.

The tire 10 is reinforced with a carcass 17 having a radial construction and a belt layer 18 disposed outward from the carcass 17 in the radial direction of the tire 10, with the belt layer 18 disposed inside the tread part 10c. The carcass 17 is constructed of one or a plurality of carcass plies consisting of organic fiber cords. In the first embodiment, the carcass 17 is constructed of one carcass ply. Both ends of the carcass 17 are folded back around bead cores 19. In the first embodiment, the belt layer 18 is constructed of inner and outer belt plies 18a, 18b layered on each other in the radial direction of the tire 10. The belt plies 18a, 18b are arranged, with steel cords composing the belt plies 18a, 18b forming an angle of 10 to 30° to an equator C of the tire and intersecting with each other. The belt ply 18a disposed inward from the belt ply 18b in the radial direction of the tire is formed wider than the outward belt ply 18b.

In the above-described construction, because RFID tag 16 is fixedly accommodated in the accommodating portion 15c formed as the concavity of the sponge material 15 fixed to the rim-mounted side surface 10a of the pneumatic tire 10, the RFID tag 16 is stably fixed, with the RFID tag 16 being appropriately protected from being subjected to external shocks and vibration. Thus it is possible to enhance the durability of the RFID tag 16. Further the mounting of the RFJD tag 16 on the tire 10 is completed by merely bonding the fixed surface 15a of the sponge material 15 in which the RFID tag 16 is fixedly accommodated to the rim-mounted side surface 10a of the tire 10 with the double-side adhesive tape or the like. Therefore this construction improves the workability.

Because the RFID tag 16 is not directly embedded in the tire 10, the durability of the tire 10 can be enhanced without damaging the tire 10. Further the sponge material 15 fixed to the tire 10 is capable reducing the road noise greatly.

The second embodiment is described below. As shown in FIG. 5, the assembly 12 is formed in a manner similar to that adopted in the first embodiment except that in the second embodiment, an accommodating portion 15c is formed as a slit formed by cutting the sponge material 15 from the free surface 15b thereof toward the fixed surface 15a thereof and that the RFID tag 16 is fitted in the slit by press fit.

Figure 5A:
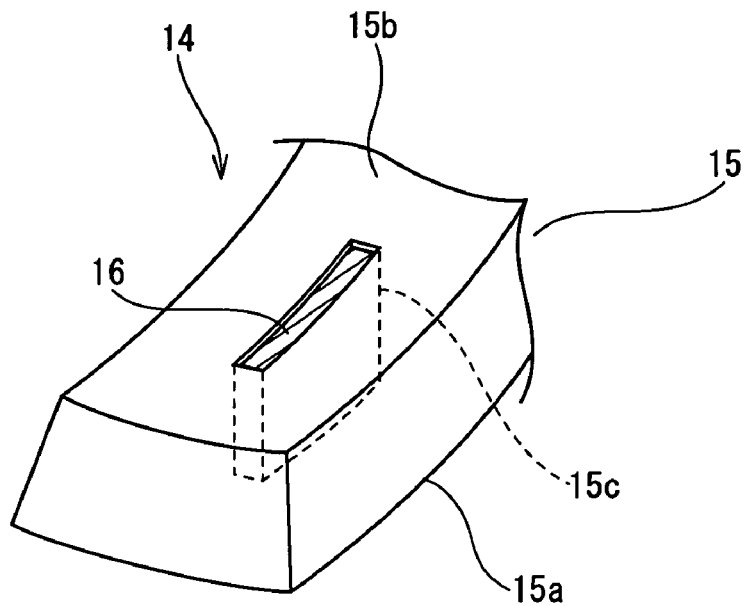
FIG. 5 is an enlarged sectional view showing a radio tag-mounting member, for use in a tire, of a second embodiment of the present invention.
Figure 5B:
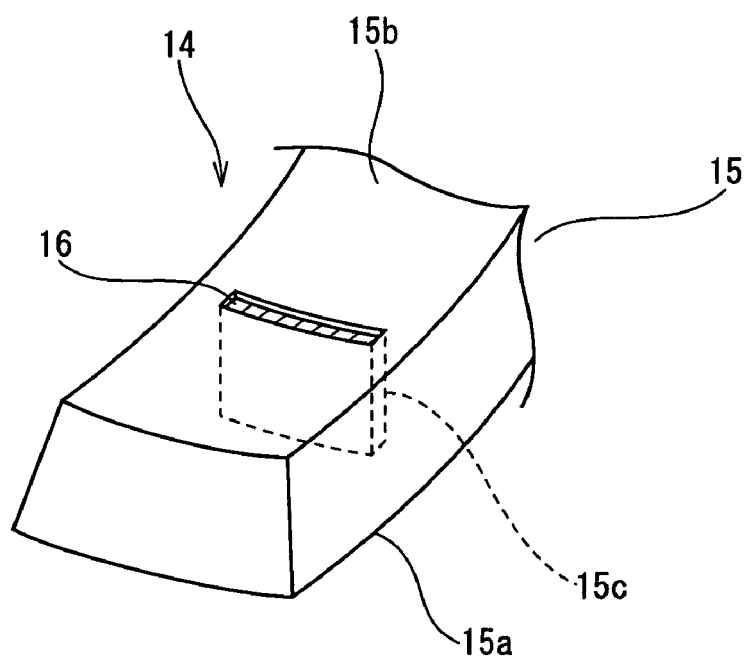

In the second embodiment, as shown in FIG. 5A, the accommodating portion 15c is formed as the slit in the circumferential direction of the tire 10. But the accommodating portion 15c may be formed in the widthwise direction thereof, as shown in FIG. 5B. The slit is formed a little smaller than the RFID tag 16 so that the RFID tag 16 can be fitted in the slit by press fit. The RFID tag 16 is embedded in the slit without projecting the RFID tag 16 from the free surface 15b of the sponge material 15.

In the above-described construction, because RFID tag 16 is fixedly accommodated in the accommodating portion 15c formed as the slit of the sponge material 15 fixed to the rim-mounted side surface 10a of the pneumatic tire 10, the RFID tag 16 is stably fixed, with the RFID tag 16 being appropriately protected from being subjected to external shocks and the vibration. Thus it is possible to enhance the durability of the RFID tag 16. Further because the RFID tag 16 can be fixed to the sponge material 15 by merely fitting it in the slit by press fit, it is unnecessary to fix the RFID tag 16 with the adhesive agent or the like. Therefore this construction improves the workability.

Figure 6:
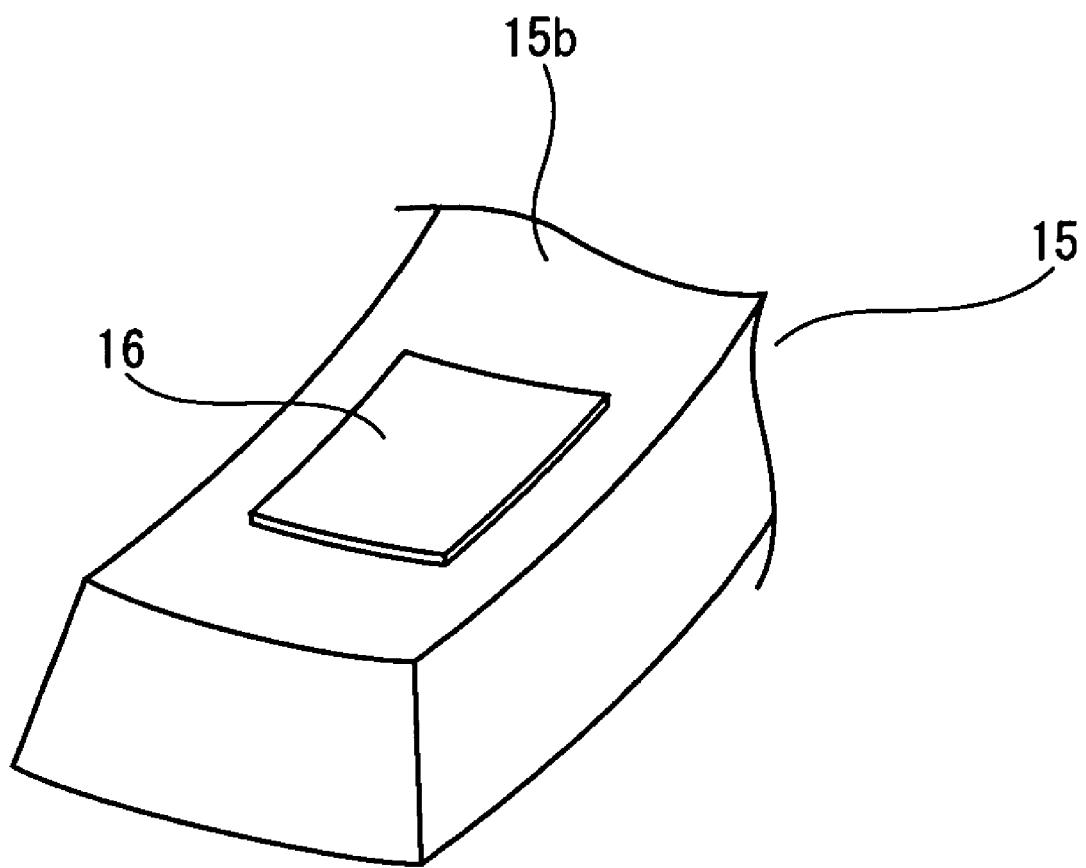
FIG. 6 is an enlarged sectional view showing a radio tag-mounting member, for use in a tire, of a third embodiment of the present invention.

FIG. 6 shows the third embodiment in which the concavity or the slit for accommodating the radio tag is not formed in the sponge material 15, but the radio tag 16 is bonded to a desired portion of the free surface 15b of the sponge material 15 with the adhesive agent. The means for fixing the radio tag 16 to the sponge material 15 is not limited to the adhesive agent, provided that the radio tag 16 can be fixed to the sponge material 15.

As described above, by mounting the radio tag 16 on the surface of the sponge material 15, the mounting position of the radio tag 16 is not specified but the radio tag 16 can be mounted at any desired position of the sponge material 15, and it is unnecessary to provide a process of forming the accommodating portion on the sponge material 15.

Figure 7:
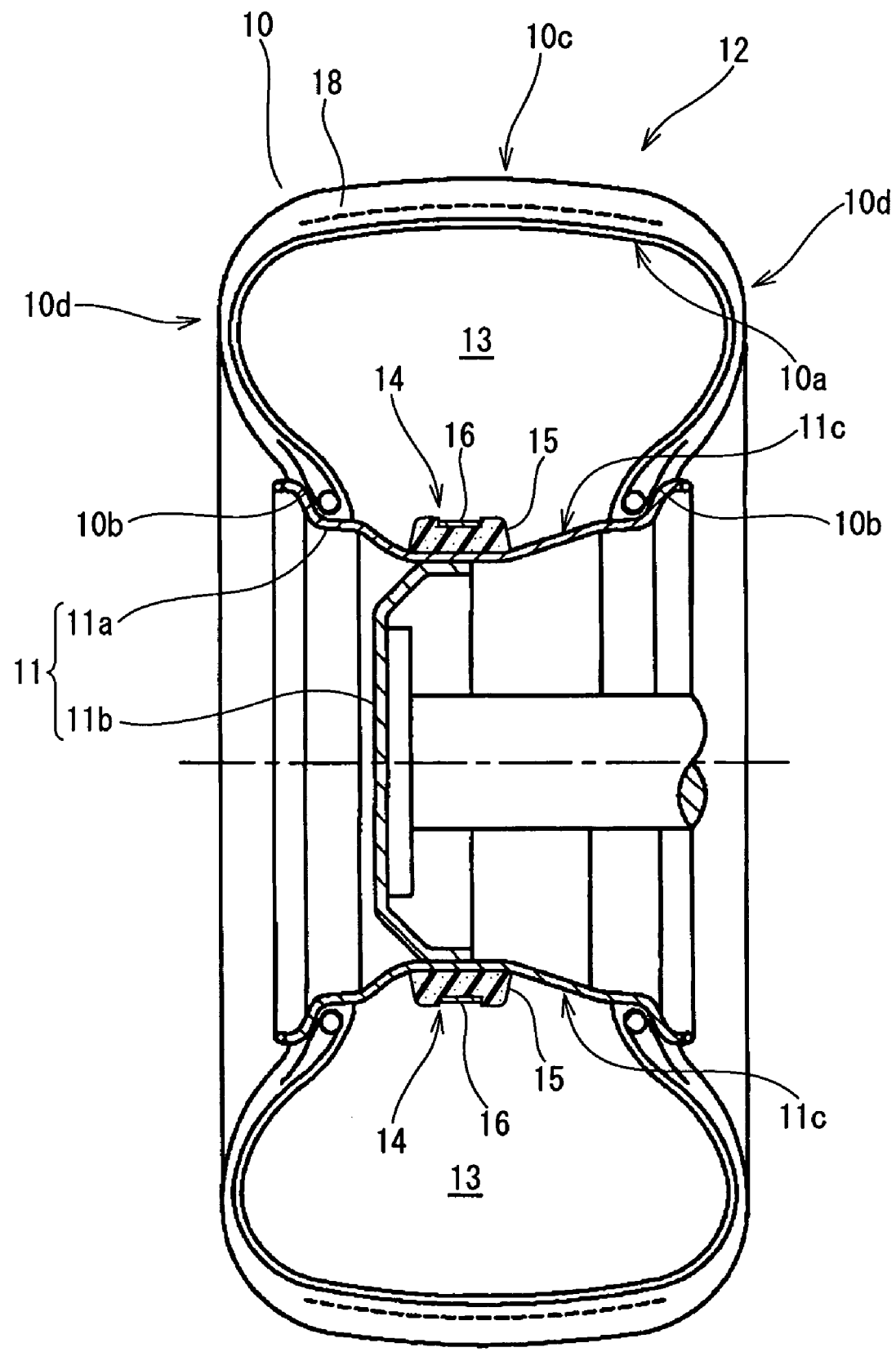
FIG. 7 is a sectional view showing an assembly, composed of a pneumatic tire and a rim, of a fourth embodiment of the present invention.

FIG. 7 shows the fourth embodiment in which the assembly 12 is formed in a manner similar to that adopted in the first embodiment except that in the fourth embodiment, the radio tag-mounting member 14 is fixed to a tire-mounting side surface 11c of the rim 11.

More specifically, the fixed surface 15a of the sponge material 15 in which the RFID tag 16 is fixedly accommodated is bonded to the tire-mounting side surface 11c of the rim 11 with the double-side adhesive tape.

In the above-described construction, because RFID tag 16 is fixedly accommodated in the accommodating portion 15c of the sponge material 15 fixed to the tire-mounted side surface 11c of the rim 11, the RFID tag 16 is stably fixed, with the RFID tag 16 being appropriately protected from being subjected to external shocks and vibration. Thus it is possible to enhance the durability of the RFID tag 16. Further the mounting of the RFID tag 16 on the tire 10 is completed by mounting the rim 11 to which the radio tag-mounting member 14 for use in the tire is fixed on the pneumatic tire 10. Therefore it is unnecessary to perform a work inside the tire and hence enhance the rim-assembling efficiency.

The examples of the present invention and the comparison examples are described below.

EXAMPLES 1 THROUGH 13 AND COMPARISON EXAMPLE 1

The assemblies 12 having the basic construction shown in FIG. 1 and the specification shown in table 1 were prepared to test the durability of each RFID tag 16 and the road noise performance. The common specification is as shown below.

Tire size: 195/65R15
Rim size: 15×6JJ
Entire volume V1 of inner space 13: 35900 $cm^3$
Sectional configuration of sponge material 15: trapezoidal and symmetrical in right-to-left direction
Length L of sponge material 15 in circumferential direction of tire: 1850 mm
Angle of tapered portion of both ends of sponge material 15: as shown in table 1
Method of fixing sponge material 15 to tire: The rod-shaped sponge material 15 was curved along the tread region of the rim-mounted side surface 10a of the tire 10 and was bonded to the rim-mounted side surface 10a with the double-side adhesive tape (manufactured by Nitto Denko Inc. "5000 NS").

In table 1, makers of the sponge material 15 are as shown below:
※1: Achilles Inc.
※2: Inoack Corp.
※3: Kurashiki Boseki Inc.
※4: Marusuzu Inc.

The test method is as described below:

Durability Test

Each specimen assembly 12 was driven on a drum (diameter: 1.7 m) by 6000 km and 12000 km in the following conditions. At each time, the state of each RFID tag 16 was visually checked. RFID tags 16 which were protected favorably from being subjected to shocks and vibrations and did not drop from the tire nor were damaged were evaluated as ◯, whereas RFID tags 16 which were protected unfavorably from being subjected to shocks and vibrations, dropped from the tire or damaged were evaluated as X.

Internal pressure: 200 kPa
Load: 6.5 kN (1.2 times larger than maximum value specified by JATMA)
Travel speed: 80 km/hour Road Noise Performance Each specimen assembly 12 was mounted on all wheels of a home-manufactured FF car of 2000 cc. The car was driven on a road (asphalt road having rough surface) for measuring a road noise at a speed of 60 km/hour. A microphone was set at the window side of the driver's seat close to the ear of a tester to collect a noise inside the car and measure a sound pressure level of a peak value of an air column resonance sound in the neighborhood of 240 Hz.

The road noise performance was evaluated in terms of an increase or a decrease on the basis of the specimen of the comparison example 1 in which the radio tag-mounting member 14 for use in a tire was not fixed to the tire but the RFID tag 16 was directly bonded to the rim-mounted side surface of the tire 10.

The indication of "0" means that the road noise was equal to the reference value. The indication of + means that the road noise was bigger than the reference value.

Workability of Bonding Radio Tag-Mounting Member for Use in Tire on Tire

An operation of bonding the radio tag-mounting member 14 for use in the tire to the rim-mounted side surface 10a of the tire 10 with a double-side adhesive tape was performed. The ease or difficulty of the bonding work was evaluated as follows by the operator's sense.
  ○: Good
  Δ: Ordinary
  X: Difficult

TABLE 1

| | | CE1 | E1 | E2 | E3 | E4 | E5 | E6 | E7 |
|---|---|---|---|---|---|---|---|---|---|
| Volume ratio (V2/V1, %) | | 0 | | | | 6.4 | | | |
| Specification of sponge material | Maker of sponge material | — | ※1 | ※2 | ※2 | ※3 | ※4 | ※2 | ※2 |
| | Pattern number | | EY | EFS | ER-14 | 300S | E16 | EL-69 | ESH |
| | Height H (mm) | — | | | | 20 | | | |
| | Width (mm) | — | | | | 100 | | | |
| | H/W | — | | | | 0.2 | | | |
| | Hardness (N) | — | 50 | 20 | 50 | 60 | 80 | 90 | 140 |
| | Tensile strength (kPa) | — | 80 | 110 | 90 | 100 | 80 | 150 | 120 |
| | Specific gravity | — | 0.017 | 0.021 | 0.025 | 0.019 | 0.016 | 0.035 | 0.044 |
| | Angle (degree) at both ends (tapered portion) | — | | | | 45 | | | |
| Results of test | Road noise performance | — | −5.5 | −5.0 | −5.6 | −4.8 | −5.0 | −6.7 | −7.8 |
| | Durability (6000 km travel) | X | ○ | ○ | ○ | ○ | ○ | ○ | ○ |
| | Durability (12000 km travel) | X | ○ | ○ | ○ | ○ | ○ | ○ | ○ |
| | Workability in bonding work | — | ○ | ○ | ○ | ○ | ○ | ○ | ○ |

| | | E8 | E9 | E10 | E11 | E12 | E13 |
|---|---|---|---|---|---|---|---|
| Volume ratio (V2/V1, %) | | | | 6.4 | | | |
| Specification of sponge material | Maker of sponge material | ※4 | ※3 | ※3 | ※3 | ※1 | ※2 |
| | Pattern number | NE28 | 301K | 333H | 440C | PD | EMM |
| | Height H (mm) | | | 20 | | | |
| | Width (mm) | | | 100 | | | |
| | H/W | | | 0.2 | | | |
| | Hardness (N) | 110 | 120 | 170 | 80 | 130 | 220 |
| | Tensile strength (kPa) | 110 | 110 | 160 | 130 | 140 | 120 |
| | Specific gravity | 0.025 | 0.019 | 0.023 | 0.034 | 0.025 | 0.052 |
| | Angle (degree) at both ends (tapered portion) | | | 45 | | | |
| Results of test | Road noise performance | −6.1 | −5.8 | −5.4 | −6.4 | −5.4 | −8.5 |
| | Durability | ○ | ○ | ○ | ○ | ○ | ○ |

TABLE 1-continued

| | | | | | | |
|---|---|---|---|---|---|---|
| (6000 km travel) | | | | | | |
| Durability (12000 km travel) | ○ | ○ | ○ | ○ | ○ | ○ |
| Workability in bonding work | ○ | ○ | ○ | ○ | ○ | ○ |

E and CE in the uppermost column indicate example and comparison example respectively.

From the test results, it was confirmed that in the assemblies 12 of the examples 1 through 13, the road noise was decreased, the RFID tag 16 was protected, the RFID tag 16 was prevented from dropping from the radio tag-mounting member 14, deforming, and being damaged, and thus the assemblies 12 had durability improved over the assembly of the comparison example 1. It was also confirmed that the RFID tag 16 of the examples 1 through 13 could be mounted on the tire 10 with a higher workability than the RFID tag 16 of the comparison example 1.

What is claimed is:

1. A radio tag-mounting member for use in a pneumatic tire comprising:
    a sponge material fixed to said pneumatic tire at a rim-mounted side surface thereof or fixed to a rim at a tire-mounted side surface thereof; and
    a radio tag having a portion for detecting an internal state of said pneumatic tire or a portion for recording identifying information of said pneumatic tire,
    wherein said sponge material has a volume V2 in a range of 0.4 to 20% of an entire volume V1 of an inner space surrounded with said pneumatic tire and said rim; and a specific gravity in a range from 0.005 to 0.06, and wherein:
        said radio tag is inserted into and fixedly accommodated in an accommodating portion formed in said sponge material as a concavity or as a slit-shaped notch, one surface of said sponge material is formed as a fixed surface to be fixed to said pneumatic tire at said rim-mounted side surface thereof or to be fixed at said rim at said tire-mounted side surface thereof, with said rim-mounted side surface and said tire mounted side surface facing said inner space surrounded with said rim and said pneumatic tire mounted on said rim, a surface of said sponge material opposite to said fixed surface thereof is formed as a free surface facing said inner space, said accommodating portion of said sponge material has an opening formed on said free surface, and said radio tag is inserted into said accommodating portion from said opening and fixed thereto with an adhesive agent or by press fit; or
        said radio tag is fixed to a surface of said sponge material.

2. The radio tag-mounting member according to claim 1, wherein a sectional configuration of said sponge material orthogonal to a circumferential direction thereof is trapezoidal or rectangular;
    said accommodating portion is formed as a shallow concavity on said free surface, and said radio tag is horizontally inserted into and fixed to said accommodating portion with said adhesive agent; or
    said accommodating portion is formed as a slit on said free surface by cutting said sponge material from said free surface toward said fixed surface, and said radio tag is fixed to said accommodating portion by press fit;
    said radio tag is embedded in said accommodating portion without projecting said radio tag from said free surface of said sponge material.

3. The radio tag-mounting member according to claim 1, wherein said radio tag consists of an RFID tag comprising:
    a sensor portion for detecting an internal state of said tire including at least one of an internal temperature of said tire and an internal pressure of said tire;
    at least one of a recording portion for recording inherent identifying information for specifying in each tire including one or more of a manufacturer of said tire, a manufacturing factory of said tire, and a manufactured date of said tire, and a recording portion capable of rewriting history information of said tire including one or more of a travel distance of said tire, a number of suddenly braked times of said tire, a number of suddenly started times of said tire, and a number of suddenly turned times of said tire; and
    a signal-sending portion for sending signals sent from at least one of said sensor portion and said recording portions to an antenna mounted on a car body in such a way that said antenna is capable of receiving said signals.

4. A pneumatic tire wherein a radio tag-mounting member for use in a tire according to claim 1 is fixed to said rim-mounted side surface of said tire, said rim-mounted side surface being a tread region.

5. An assembly composed of a pneumatic tire and a rim, wherein a radio tag-mounting member for use in a tire according to claim 1 is fixed to said rim on which said pneumatic tire is mounted.

* * * * *